3,040,099
POLYNITRO-NITRAMINE POLYMERS AND METHOD OF PREPARING SAME

Henry Feuer, West Lafayette, Ind., and Robert Miller, East Paterson, N.J., assignors to Purdue Research Foundation, Lafayette, Ind., a corporation of Indiana
No Drawing. Filed Dec. 24, 1958, Ser. No. 783,649
1 Claim. (Cl. 260—584)

Our invention relates to polynitro-nitramine polymers and more particularly, it relates to the production of polynitro-nitramine polymers by the reaction of 2-nitroalkyl diesters with the salt of a primary aliphatic or aromatic polynitramine in the presence of a weak base.

The polynitro-nitramine polymers produced in accordance with our invention have the following structural formula:

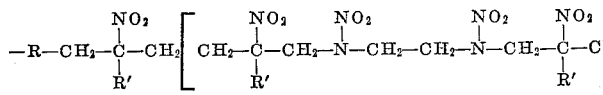

wherein R is hydroxy, methoxy, or tertiary butoxy; R' is hydrogen or hydroxymethyl; and $n$ is an integer ranging from 1–3.

The nitroesters which we employ in our process have the following structural formula:

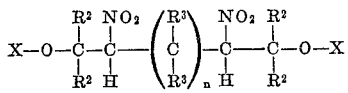

where X is

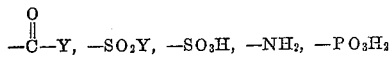

Y is hydrogen, alkyl having up to ten carbon atoms or aryl. Examples of 2-nitroalkyl esters which we may employ include: 1,6 - diacetoxy-2,5 - dinitrohexane, 1,7-diacetoxy-1,7-diphenyl-2,6-dinitroheptane, 1,6 - diheptoxy-1,6-diphenyl-2,5-dinitro-3,3,4,4-tetrafluorohexane, 1,10-diacetoxy-2,9-dinitro-decane, 1,5 - diacetoxy - 2,4 -dinitro-3,3 - difluoropentane, 2,6 - diacetoxy - 3,5-dinitroheptane, 8,18 - diacetoxy-9,17 - dinitro - 8,18 - diheptylpentacosane, 3,11-diacetoxy - 3,11 - dimethyl-4,10-dinitro-5,5,6,6,7,7 8,8,9,9 - decafluorotridecane; 1,10 - (2,9-dinitrodecyl)diphosphate, 1,5 - dinitrato-2,4-dinitro-3,3-difluoropentane, 1,6 - disulfato - 2,5-dinitrohexane and 1,7-diformato-1,7-diphenyl-2,6-dinitroheptane, etc.

In preparing our polynitro-nitramine polymers, we react 2-nitroalkyl diesters in the presence of a weak base with the salts of aliphatic or aromatic nitramines having the following general formula:

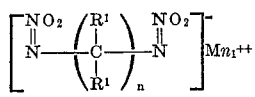

where M is a metal ion selected from the group consisting of the alkali metals and alkaline earth metals; and $n_1$ is the integer two. We prefer to utilize a nitramine where $n_1$ is two as soluble linear polymers are formed from these nitramines whereas insoluble crosslinked polymers are formed where $n_1$ is more than two.

The weak bases which can be used in carrying out our process for the production of polynitro-nitramine polymers include carbonates, bicarbonates, sulfites, phosphates, borates, etc.; hydroxides such as, for example, sodium hydroxide, potassium hydroxide, calcium hydroxide, barium hydroxide, etc.; esters such as sodium acetate, sodium propionate, potassium acetate, barium acetate, etc.

The type of solvent utilized in our process determines the chain length of the polymers. Where a completely inert solvent is utilized in our process, long chain polymers are produced, where a mixture of a completely inert solvent and a small amount of a slightly reactive solvent is utilized, a polymer having an intermediate chain length will be formed, and where a short polymer is desired the entire solvent medium is slightly reactive. Of course it is obvious that the terminal radicals of our polymers will vary according to the solvent and it is possible to make polymers having unlike terminal radicals by using a solvent medium composed of a mixture of two or more slightly reactive solvents.

Our reaction for the production of long chain polynitro-nitramine polymers from 2-nitroalkyl diesters and the salts of polynitramines in the presence of weak base is effected in solvents totally inert to the reactants and totally inert to the resulting polynitro-nitramine polymers, as for example, tetrahydrofuran, dimethylsulfoxide, di-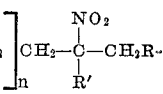acylalkyl amides, such as dimethylformamide, dimethylacetamide, etc.; hydrocarbons, such as hexane, octane, toluene, xylene; thioethers, such as dimethyl sulfide, diethylsulfide, etc.; chlorinated hydrocarbons, such as carbontetrachloride, chloroform, etc.; ethers, such as diethylether, dimethylether, methylphenylether, etc.

When it is desired to form a short chain polymer, such as 1,26 - dimethoxy-7,10,17,20-tetraaza-2,5,7,10,12,15,17 20,22,25-decanitrohexacosane, a slightly reactive solvent is utilized and the terminal radical of the polymer will be taken from the solvent molecule. Examples of slightly reactive solvents include water; alcohols, such as methanol, ethanol, etc.; thioalcohols such as methylmercaptan, ethylmercaptan, etc.; nitroparaffins, such as nitromethane, dinitromethane, nitroethane, tetranitroethane, 1-nitropropane, etc.; nitroalcohols, such as nitroethanol, 2,2-dinitropropanol, etc.

The chain length of our polymers can also be varied by the utilization of sterically hindered slightly reactive solvents such as t-butylalcohol, t-butylmercaptan, etc.

The utilization of slightly reactive solvents to terminate polymer chains is quite important for it provides a means of bonding the polymer to the reaction motor case by conversion to a cross-linked polymer by treatment with a small amount of diisocyanate or dicarboxylic acid.

Our compounds are solids. As such, they are solid propellants for reaction motors. These polymers are stable to shock, heat, etc. to the extent that, as a general rule, additional stabilizers are not required for the propellant mixtures.

Monomers prepared by the process of our invention are plasticizers for nitropolymers formed by the process of our invention. These propellants can be dissolved in polar solvents, such as dimethylformamide and lower nitro alkanes such as tetranitromethane, and, as they are generally fuel rich, can be utilized as a fuel in the process of U.S. Patent No. 2,537,526 where tetranitromethane and hexanitroethane were used as oxidants and liquid nitroparaffins, such as nitroethane, 1-nitropropane, 2-nitropropane, etc., were used as fuels; in the processes described in U.S. Patents Nos. 2,582,048 and 2,548,803 wherein nitro substituted aliphatic compounds having more than one nitro group per carbon atom were used as oxidants and nitro substituted compounds having less than one nitro group per carbon atom were used as fuels in monopropellant systems; or in the similar process of U.S. Patent No. 2,590,009. Other solvents which can be used to liquify our polymers include hydrazine, lower alkyl amines, dimethyl sulfoxide, Cellosolve, acetonitrile, lower alkanols, lower nitro esters, and lower nitro ethers.

Our polymers can be mixed with various oxidant salts, such as ammonium nitrate, ammonium perchlorate, lithium perchlorate, etc. to obtain solid heterogeneous propellants having specific impulses on the order of that of Ballistite. The following examples are offered to further illustrate our invention; however, we do not intend to be limited to the specific proportions, materials, or conditions employed, but rather we intend to include within the scope of our invention all equivalents obvious to those skilled in the art.

*Example I*

To a 300 ml. three necked flask, equipped with a condenser, thermometer and mechanical stirrer, containing 1.64 g. (0.04 mole) of 97% assay sodium hydroxide and 3.28 (0.04 mole) of sodium acetate dissolved in a mixture of 20 ml. of water and 230 ml. of methanol at 0–5°, was added 3.0 g. (0.02 mole) of ethylene dinitramine. After salt formation was complete, 5.84 g. (0.02 mole) of 1,6-diacetoxy-2,5-dinitrohexane was added at 0–5°. The reaction mixture was held at this temperature for 15 minutes, and then allowed to come to room temperature slowly, and maintained there with a water bath for four hours. The mixture was then heated to 35–37° for 17 hours. It was then cooled to 25° and filtered. The 1,26-dimethoxy-7,10,17,20-tetraaza-2,5,7,10,12,15,17,20,22,25 - decanitrohexacosane thus obtained was washed with several portions of water, 95% ethanol, and ethyl ether in that order. The product weighed approximately 6.0 g. and had an explosion point at 172°. It was purified by dissolving it in a minimum amount of dimethyl formamide containing 2–3% glacial acetic acid, and reprecipitating the product by pouring the mixture into a large excess of water with vigorous stirring. The product obtained on filtration was again washed as previously described, and yielded 4.5 g. of product. An infrared spectrum of this material revealed the expected ether band at 9 μ.

*Analysis.*—Calculated for $C_{24}H_{44}O_{22}N_{14}$: C, 32.72; H, 5.00; N, 22.27. Found: C, 33.46; H, 4.48; N, 22.00.

*Example II*

In a 125 ml. Erlenmeyer flask, containing 30 ml. of dimethyl sulfoxide and 1 drop of 10% aqueous sodium hydroxide solution was dissolved 1.0 g. of 1,26-dimethoxy-7,10,17,20-tetraaza-2,5,7,10,12,15,17,20,22,25 - decanitrohexacosane. To this mixture was added 4 ml. of 37% formalin solution with agitation. The reaction flask was then stoppered and allowed to stand at room temperature (24°–26°) for 40 hours. At the end of this time 1.5 ml. of glacial acetic acid was added to the mixture. The mixture was then poured into 400 ml. of water with vigorous agitation and the material which precipitated was filtered and washed with several portions of water, 95% ethanol, and ethyl ether, in that order. The 1,26-dimethoxy-2,5,12,15,22,25-hexa(hydroxymethyl)-7,10,17,20 - tetraaza-2,5,7,10,12,15,17,20,22,25 - decanitrohexacosane thus obtained, weighed 0.85 g. and had an explosion point at 188°. This material was purified by dissolving it in a minimum amount of dimethyl sulfoxide containing 2% glacial acetic acid, and then pouring this mixture into a large excess of water with vigorous stirring. The material which precipitated was filtered and washed as previously described.

*Analysis.*—Calculated for $C_{30}H_{56}O_{28}N_{14}$: C, 33.96; H, 5.28; N, 18.49. Found: C, 35.12; H, 5.05; N, 18.55.

*Example III*

To a 300 ml. three-necked flask, equipped with a condenser, thermometer and mechanical stirrer, containing 1.64 g. (0.04 mole) of 97% assay sodium hydroxide and 3.28 g. (0.04 mole) of anhydrous sodium acetate dissolved in a mixture of 50 ml. of water and 150 ml. of dimethyl sulfoxide at 0–5°, was added 3.0 g. (0.02 mole) of ethylene dinitramine. After salt formation was complete, 5.84 g. (0.02 mole) of 1,6-diacetoxy-2,5-dinitrohexane was added all at once. The reaction was maintained at 0–5° for fifteen minutes and then allowed to come to room temperature slowly. After being stirred approximately one hour at room temperature, the reaction mixture was heated to 39–40° for 15 hours. At the end of this time, the reaction mixture was filtered through a sintered glass funnel and the filtrate was poured with vigorous stirring into 700 ml. of water. The precipitate that formed was allowed to settle and was then filtered. The 1,16-dihydroxy-7,10-diaza - 2,5,7,10,12,15 - hexanitrohexadecane was washed with several portions of water, 95% ethanol, and ethyl ether, in that order. The gelatinous precipitate was dried in vacuum to yield 3.83 g. of product. This material did not melt on heating but exploded at 183°. The product was purified by dissolving it in a minimum amount of dimethyl sulfoxide containing 2% glacial acetic acid, and pouring the mixture with vigorous stirring into excess water. The resulting precipitate was filtered and washed as previously described.

*Analysis.*—Calculated for $C_{14}H_{26}O_{14}N_8$: C, 31.70; H, 4.91; N, 21.13. Found: C, 33.00; H, 4.33; N, 20.90.

*Example IV*

In a 500 ml. three-necked round bottom flask fitted with a mechanical stirrer, thermometer, and reflux condenser with drying tube were placed 1.64 g. (0.04 mole) 97% assay sodium hydroxide, 3.28 g. (0.04 mole) sodium acetate, and 25 ml. water. The solution was cooled to 0–5° and 3.0 g. (0.02 mole) ethylene dinitramine was added with 5 ml. water. When the salt had formed, as indicated by a clear solution and pH 9–9.5, 225 ml. t-butyl alcohol, 30 ml. dimethyl sulfoxide, and 5.84 g. (0.02 mole) 1,6-diacetoxy-2,5-dinitrohexane were added to the cold solution. The reaction mixture was stirred for 70 minutes in an ice-water bath. The ice was then removed, and the temperature rose to 28° in 4½ hours. The mixture was then heated to 42–43° for 17 hours and filtered. The solid was washed with water and dried in vacuo. The yield of polymeric material amounted to 5.73 g. It was partially dissolved in dimethyl formamide containing 2% glacial acetic acid, filtered and poured with vigorous stirring into an excess of water. The resulting precipitate was filtered through a sintered glass funnel and washed with water, ethanol, and ether, then dried in air. It was redissolved as above, precipitated, and washed to obtain an analytical sample, which did not melt but decomposed slowly between 180–200°.

*Analysis.*—Calculated for $C_{38}H_{70}O_{30}$: C, 35.46; H, 5.48; N, 21.77. Found: C, 34.77; H, 4.98; N, 21.18.

This corresponds to the following compounds: 1,36-tertiary dibutyoxy - 2,5,7,10,12,15,17,20,22,25,27,30,32,35 - tetradecanitro - 7,10,17,20,27,30 - hexazahexatriacontane.

The less soluble portion of the polymer was again treated with dimethyl formamide. The material which did not dissolve was removed by filtration again treated with dimethyl formamide, and allowed to stand for 9 days. The solid material then remaining, which had a consistency similar to a gel, was separated from liquid by centrifuging, and washed with water, ethanol, and ether. The polymer turned black at 210–230° after drying in an Abderhalden pistol.

These intentionally short chained polmers are set out to show the simplicity of the process of our invention. It is not intended that the polymers of our invention be limited to the compounds wherein $m$ is a lower integer as our process is equally operative in preparing polymers wherein $m$ is 200 or 2,000.

Now having described our invention, what we claim is:
Compositions having the following structural formula:
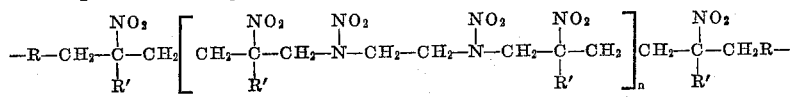
wherein R is selected from the group consisting of hydroxy, methoxy, and tertiary butoxy; R' is selected from the group consisting of hydrogen and hydroxymethyl; and $n$ is an integer ranging from 1–3.
No references cited.

UNITED STATES PATENT OFFICE
CERTIFICATE OF CORRECTION

Patent No. 3,040,099            June 19, 1962

Henry Feuer et al.

It is hereby certified that error appears in the above numbered patent requiring correction and that the said Letters Patent should read as corrected below.

Column 1, line 34, for the radical "$-NH_2$" read -- $-NO_2$ --; same line 34, immediately following the radical "$-PO_3H_2$" insert -- or other phosphoric acid radicals --.

Signed and sealed this 15th day of January 1963.

(SEAL)
Attest:

ERNEST W. SWIDER
Attesting Officer

DAVID L. LADD
Commissioner of Patents